Nov. 9, 1926.
H. A. PAGENKOFF
PROCESS FOR PRODUCING LAMPBLACK
Filed Sept. 16, 1924    2 Sheets-Sheet 1
1,606,380
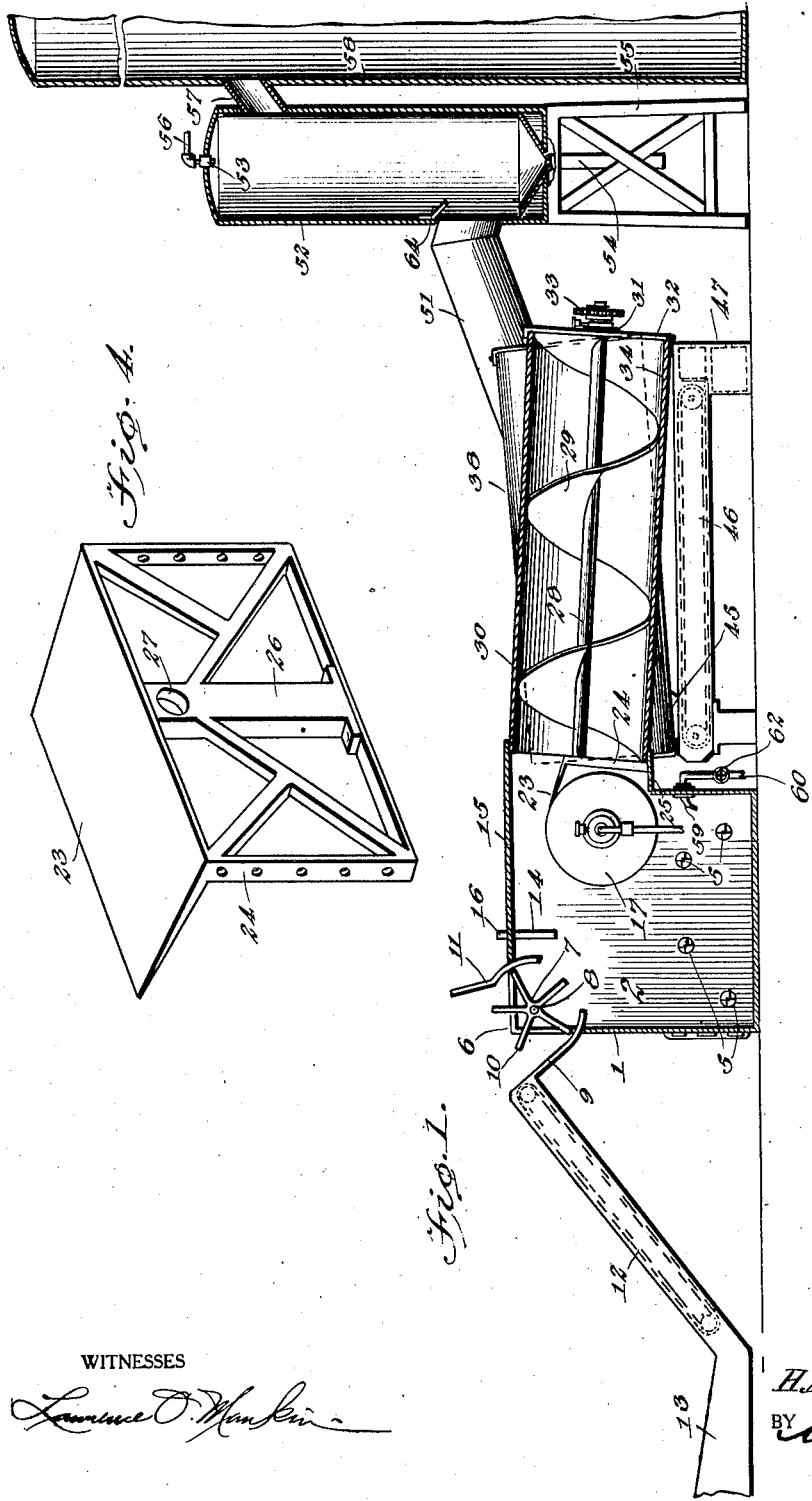

Nov. 9, 1926.  1,606,380
H. A. PAGENKOFF
PROCESS FOR PRODUCING LAMPBLACK
Filed Sept. 16, 1924    2 Sheets-Sheet 2
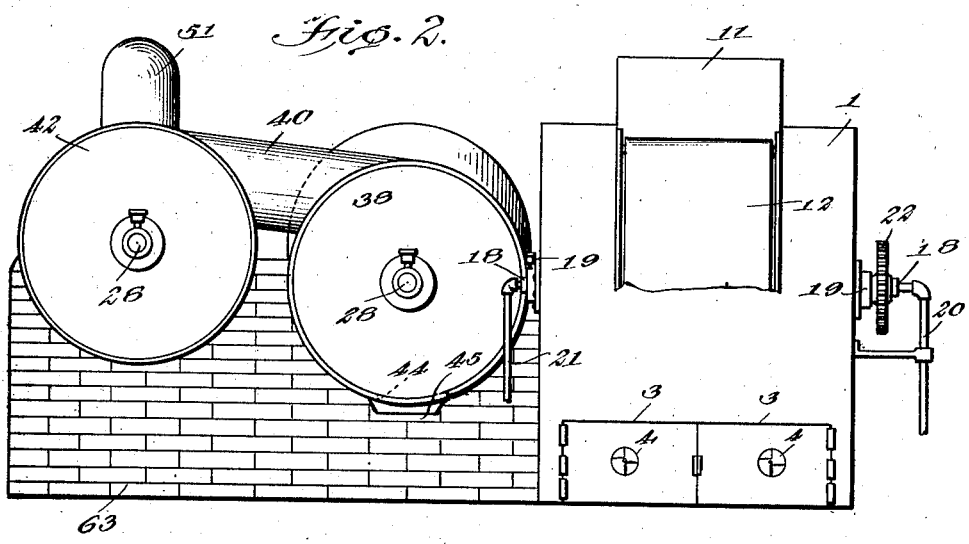
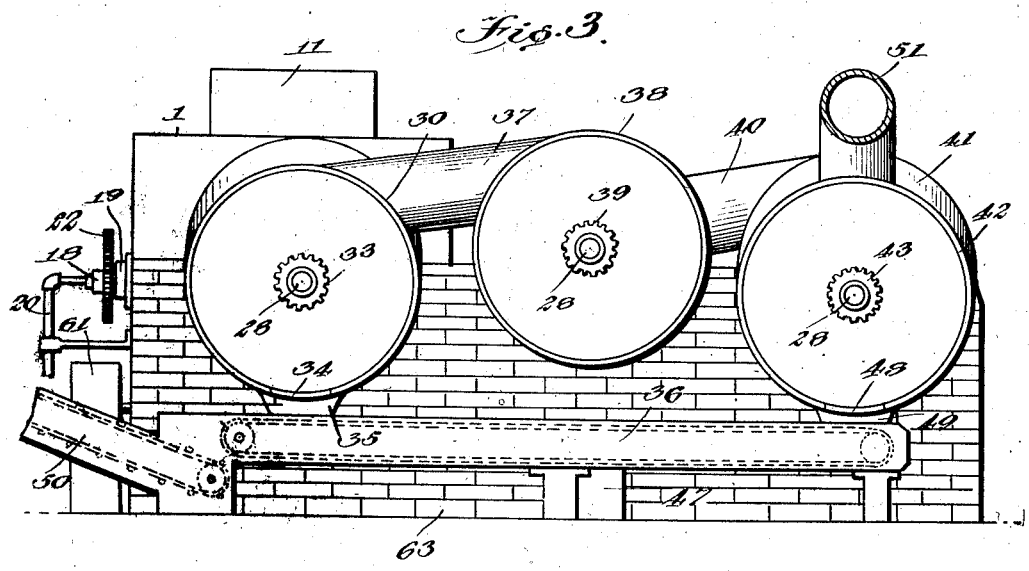
WITNESSES
INVENTOR
H. A. Pagenkoff,
BY
ATTORNEYS Patented Nov. 9, 1926.

1,606,380

UNITED STATES PATENT OFFICE.

HENRY ALBERT PAGENKOFF, OF SAN ANTONIO, TEXAS.

PROCESS FOR PRODUCING LAMPBLACK.

Application filed September 16, 1924. Serial No. 738,070.

This invention relates to a process for the manufacture of lamp black and has for its object the provision of a process whereby old automobile casings and tires both solid and pneumatic may be converted into a fertilizer and lamp black.

A further object of the invention is the provision of a process for the production of lamp black for converting into lamp black old automobile tires and casings of any type and a waste lubricating oil drained from the crank case which is found in a garage and usually mixed with kerosene and gasoline.

A further object of the invention is the provision of a process for producing black from the combustion of the basic sediment or bottom settlings (commonly called B. S.) that is found in oil storage tanks in all oil fields and tank farms or wherever crude oil or fuel is stored.

This invention will be best understood from a consideration of the following detailed description, in view of the accompanying drawing forming a part of the specification; nevertheless it is to be understood that the invention is not confined to the disclosure, being susceptible of such changes and modifications which shall define no material departure from the salient features of the invention as expressed in the appended claim.

In the drawings:

Figure 1 is a side view partly in section of an apparatus for converting refuse tires and waste lubricating oils or bottom settlings from oil storage tanks into lamp black.

Figure 2 is a front end view of the same.

Figure 3 is a rear end view of the apparatus.

Figure 4 is a view in perspective of a combined scraper and bearing frame for the driving shaft of an element of the apparatus.

Referring more particularly to the drawings, 1 designates a furnace having a combustion chamber 2 with doors 3 on its front wall for removing the products of combustion which have settled upon the floor of the combustion chamber and which is adapted to be used as a fertilizer. Draft openings 4 are formed in the doors 3 and controlled by the usual form of revolving shutters for admitting a portion of a regulated amount of air to the combustion chamber 2. Draft openings 5 are formed in the side walls of the furnace 1 for admitting further quantities of air and which are controlled in the usual manner by the revolving shutters.

The upper forward corner of the furnace is open as shown at 6 to provide an entrance for the admission of old rubber tires and casings and bottom settlings from oil tanks and a feed wheel 7 is mounted upon a shaft 8 for rotation and is adapted to receive the casings and be revolved thereby as said casings slide downwardly upon a discharging shelf 9. The wheel 7 forms a closure for the opening 6 by means of the radially disposed blades 10 engaging at their peripheries the slide 9 and the baffle 11, the slide 9 and baffle 11 being curved on the arc of a circle, the radius of which is equal to the width of the blade 10 of the wheel. Sufficient blades are employed to give the proper space to permit the tires to pass along the slide 9 and into the combustion chamber 2 and also to have a pair of blades always in engagement with the slide 9 and the baffle 11 to prevent escape of gases from the combustion chamber.

A travelling carrier 12 is connected with the slide 9 and is adapted to receive the tires from the platform 13 and carry them upwardly and deposit the same upon the slide 9 when said tires fall by gravity into the furnace when the travelling carrier 12 is disposed at an angle to the horizontal and forwardly of the front wall of the furnace.

A longitudinally movable scraper in the shape of an elongated bar 14 is suspended from the roof 15 of the furnace and has finger pieces projecting through slots in the wall 15 whereby the scraper may be moved along the top to remove carbon deposits upon the same. The slides are connected with the scraper 14 which close the opening during the operation of the scraper and are of the usual construction. These slides are in the form of a flat plate riding in guides connected with the inner face of the top of the furnace.

A cylindrical cooling drum 17 is mounted upon hollow shafts 18 which are carried by bearings 19 in the side walls of the furnace 1. An inlet pipe 20 passes through the hollow shaft 18 and is adapted to supply cooling water to the drum 17, while a pipe 21 is adapted to provide a means for the escape of the water at the opposite end of the drum and through a hollow shaft 18 which is carried by bearings 19. The usual packing glands or stuffing boxes are provided to prevent the loss of fluid at this point.

A gear 22 is connected with the shaft 18 for rotating said shaft and the drum 17. The drum is adapted to collect carbon deposits from the combustion of the materials in the furnace and is adapted to be removed by a scraper 23 formed integrally with a bracket 24. This bracket is rigidly connected with the walls of an offset portion 25 of the furnace 1 and which is at the rear of the drum and the furnace.

The bracket is provided with a central post 26 at the upper end of which is a bearing 27 at the inner end of a shaft 28 carrying the spiral scraper 29. This spiral scraper is adapted to engage the inner surfaces or walls of a cylindrical drum 30 mounted at the rear of the furnace 1 and in open communication with the furnace through the rear wall at the offset portion 25 of said furnace. The other end of the shaft 28 is mounted in bearings as shown at 31 at the outer end wall 32 of the cylinder 30. Said shaft beyond the end wall 32 is provided with a driving sprocket 33 which is engaged by a sprocket chain, the chain being driven in any suitable manner from a power plant.

It will be seen that the cylinder 30 is tilted rearwardly at an angle to the horizontal and has an opening 34 through which is discharged the lamp black straight from the drum 17 and from the walls of the cylinder 30 by the scraper 29. The screw formation of the scraper 29 forces the black through the rear end of said cylinder for discharging through the opening 34. This black passing through the spout 35 connected with the opening 34 is deposited upon a traveling carrier 36 whence it is then delivered to hoppers and bolters (not shown) and automatically packed.

The smoke having passed through the cylinder 30 passes through a conduit 37 which is connected with the rear and lower end 32 of the cylinder 30 and with the rear higher end of a similarly constructed cylinder 38. This cylinder is also provided with a shaft 28 and a spiral scraper 29, the shaft being driven by a sprocket wheel 39. The conduit 40 connects the lower forward end of cylinder 38 with the higher forward end 41 of a cylinder 42 which is similar in construction with the cylinders 30 and 38 and is also provided with a driving shaft 28 for a spiral scraper 29. Shaft 28 is driven by a sprocket wheel 43 and a chain connecting said wheel.

The forward lower end of the cylinder 38 is provided with an opening 44 at the periphery of which is connected a spout 45 adapted to discharge carbon formed in the cylinder 38 onto a conveyor 46. This conveyor carries the carbon and deposits the same into a box 47 located adjacent the rear of the cylinder 38 and adjacent the travelling plate 36. The cylinder 42 is provided with an opening 48 at its rear lower end and at the periphery of which is connected a hopper 49 through which carbon is discharged upon the conveyor 36. The conveyor carries the carbon from the cylinders 30 and 42 and discharges the same upon a conveyor 50 which, as has been described, carries the lamp black to hoppers and bolters where the black is automatically packed. The bolters and hoppers now in use in the natural gas carbon black plants may be employed in this connection.

From the cylinder 42 the smoke is carried by a stack 51 to a scrubber 52. The scrubber is in the shape of a spray nozzle 53 at its upper end to provide a spray of water through which the smoke is passed and relieved of any remaining lamp black in the smoke. The black is carried by the water through a pipe 54 to screens where the carbon is collected. The scrubber 52 is supported upon a trestle 55. The nozzle 53 is supplied with water through a pipe 56 connected in turn to a water supply.

The smoke having been finally cleaned of all the carbon is carried through pipe 57 into a stack 58 where it is eventually discharged into the atmosphere. The ashes, which are removed from the floor of the furnace 1, are adapted to be used as fertilizer.

When waste oils are used in connection with the burning of the old tires or casings oil is supplied through a nozzle 59 connected with a pipe 60. This pipe extends from a tank 61 located at any convenient point adjacent the furnace and sufficiently elevated to permit the oil to be forced by gravity into the furnace. A valve 62 is employed in the pipe line for controlling the flow or stopping the flow of waste lubricating oil to the furnace. The old tires and casings are supplied to the conveyor 12 and carried upwardly to the slide 9 where they are discharged upon the slide. The tires then slide by gravity past the valves 10 of the wheel and into the combustion chamber 2 of the furnace 1. Any means may be employed for igniting the tires and after once ignited the combustion will be ordinarily maintained by the regulation of the draft through the openings 4 and 5 in the furnace wall.

The cylinder 17 in the furnace collects the carbon which is scraped as the cylinder revolves by the member 23. This carbon falls by gravity over the scraper and into the cylinder 30 whence it is carried by the spiral scraper 39 to the opening 34 and discharged upon the conveyor 36. Since the spiral scraper 29 is revolved the carbon is constantly removed from its walls and likewise discharged through the opening 34. The gases continue in their path from cylinder 30 to cylinders 38 and 42 and the spiral scrapers in these cylinders remove the carbon deposited upon the inner walls of the cylinders and discharge it through the various openings at the lower end of said cylinders.

The cylinders 30, 38 and 42 are supported upon a brick wall 63 in the usual manner. A baffle 64 is mounted on the inner wall of the scrubber 52 and is located at the entrance of conduit 51 with said scrubber so that the smoke issuing from said conduit will be forced outwardly into the spray from nozzle 53.

It will be noted that the cylinders 30, 38 and 42 are exposed to the atmosphere and are therefore thus cooled so that carbon deposits are constantly forming on the cooled inner surfaces of said cylinders and the spiral scrapers are continuously removing said deposits.

What I claim is:

A process for forming lamp black which comprises burning oil and old tires in a closed space with a restricted quantity of air, passing the smoke thus formed over a cool revolving surface whereby carbon is deposited upon said revolving surface, passing the smoke through a restricted downward path while cooling the outer portions of the smoke to cause deposition of carbon, further passing the smoke partially depleted of its carbon through other restricted spaces while cooling the outer portions of the smoke and then spraying the smoke with water to remove the remaining carbon from said smoke.

HENRY ALBERT PAGENKOFF.